United States Patent [19]

Kelly

[11] Patent Number: 4,590,411
[45] Date of Patent: May 20, 1986

[54] LINEAR MOTORS AND CONTROL CIRCUITRY THEREFOR

[76] Inventor: Hugh-Peter G. Kelly, 66, Westleigh Avenue, Lehigh-On-Sea, Essex, England

[21] Appl. No.: 415,383

[22] Filed: Sep. 7, 1982

[30] Foreign Application Priority Data

Sep. 7, 1981 [GB] United Kingdom ............... 8127003

[51] Int. Cl.$^4$ .............................................. G05B 11/00
[52] U.S. Cl. ..................................... 318/687; 318/616
[58] Field of Search ................................. 318/687, 616

[56] References Cited

U.S. PATENT DOCUMENTS

| | | |
|---|---|---|
| 3,586,891 | 3/1970 | Applequist et al. |
| 3,597,750 | 1/1969 | Brunner et al. |
| 3,721,882 | 3/1973 | Helms |
| 3,906,326 | 8/1975 | Chur |
| 3,917,987 | 11/1975 | Inoue |
| 4,221,995 | 9/1980 | Barkman ........................ 318/616 |

FOREIGN PATENT DOCUMENTS

| | | |
|---|---|---|
| 2729697 | 1/1979 | Denmark |
| 1115881 | 5/1968 | United Kingdom |
| 1419514 | 12/1975 | United Kingdom |
| 2000589 | 1/1979 | United Kingdom |
| 2014721 | 7/1979 | United Kingdom |
| 2086039 | 5/1982 | United Kingdom |

*Primary Examiner*—William M. Shoop, Jr.
*Assistant Examiner*—Saul M. Bergmann
*Attorney, Agent, or Firm*—Fleit, Jacobson, Cohn & Price

[57] ABSTRACT

The relative position of the armature and stator of a linear motor is controlled using the outputs of two optical transducers in phase quadrature from an optical graticule disposed along the length of the stator. An analog, velocity-indicating signal is derived from the output of the optical transducers. The optical transducers are digitized and cycle an up/down counter which produces an output of a ten-bit digital word representing the armature position. The outputs of the up/down counter are used as the ten higher order bits of the twelve-bit digital word representing the armature position which is compared by a comparator with a demanded armature position. The two lower order bits of the actual-position word are derived directly from the digitized outputs of the optical transducers to eliminate the effect of variation in the exact position at which the counter is reset to zero by a position-detecting switch. While the positional error is large, the motor is servoed in accordance with a predetermined velocity profile and, when the higher order bits of the position error word are zero, the circuitry switches over to a position-servo mode using as the actual position signal, the analog output of one of the optical transducers. The commutation of the motor coils is controlled in accordance with the seventh and eighth bits of the output of the up/down counter, the graticule spacing being chosen to equal the commutation spacing divided by two raised to an integral power.

20 Claims, 8 Drawing Figures

LINEAR MOTORS AND CONTROL CIRCUITRY THEREFOR

The present invention relates to linear motors and control circuitry therefor.

A form of linear motor suitable for being driven by the control circuitry of this invention is described in my copending UK application No. 8114596, the disclosure of which is herein incorporated by way of reference, and comprises a stator and an armature movable lengthwise relative to one another, the stator and armature each comprising a respective set of magnets disposed in a predetermined sequence in the direction of relative movement, the magnets of one set being arranged in a stack lengthwise of the direction of relative movement and the poles of the other set of magnets being annular and disposed around and slidable relative to the stack, one set of magnets being permanent magnets and the other set being provided by coil windings, the arrangement being such that by appropriate energisation of the coil windings a net thrust to cause relative movement of the armature and stator in a desired direction can be produced at any position in a range of relative armature and stator positions.

There are many forms of circuitry for controlling both rotary and linear motors. The general object of such circuitry is to enable the velocity and positional movements of the motors to be controlled accurately according to externally applied parameters. Linear motors however, are not widely favoured in many applications, e.g. high speed character printers, on account of the difficulty of achieving rapid and accurate translational and positional control.

According to the present invention, there is provided a servo device comprising a position transducer having two relatiely movable parts and at least one output and circuitry, comprising a digital counter, the digital counter having a plurality of outputs, the circuitry being adapted to provide a digital word representing the relative position of the two transducer parts, higher order bits of the digital word being derived from the output of a digital counter cycled by the output of the transducer and the lower order bit or bits being derived directly from the output of the position transducer.

The invention also provides, in combination: a linear motor comprising a stator and an armature movable lengthwise relative to one another, the stator and armature each comprising a respective set of magnets disposed in a predetermined sequence in the direction of relative movements, the magnets of one set being arranged in a stack lengthwise of the direction of relative movement and the poles of the other set of magnets being annular and disposed around and slidable relative to the stack, one set of magnets being permanent magnets and the other set being provided by coil windings, the arrangement being such that by appropriate energisation of the coil windings a net thrust to cause relative movement of the armature and stator in a desired direction can be produced at any position in a range of relative armature and stator positions; and a servo device comprising a position transducer having two relatively movable parts, one being fixed relative to the armature and the other being fixed relative to the stator; and circuitry for providing a digital word representing the relative position of the two transducer parts, higher order bits of the digital word being derived from the outputs of a digital counter cycled by the output of the transducer and the lower order bit or bits being derived directly from the output of the position transducer, the circuitry including means to produce drive signals for the motor coils from said digital word.

Suitably, closed loop control circuitry is provided for use with a linear motor especially but not exclusively of the form claimed in the aforementioned copending patent application No. 8114596, the control circuitry comprising, transducer means for detecting the relative and absolute positions of the armature of the motor with respect to its stator and for providing a digital word for representing the said positions, higher order bits of the digital word being stored within a primary counter and lower order bits being derived directly from the transducer means, commutation information for commutating the motor in such manner as to provide a desired thrust profile, and logic soft, firm and/or hardware to co-ordinate the positional information with the commutation information such that in combination, the velocity and position of the motor may be controlled to a precise degree by velocity and positional information applied to the said control circuitry. The transducer means for detecting the position of the armature of the motor with respect to its stator may comprise, two relatively movable parts, one fixed relative to the armature and the other fixed relative to the stator, one of the transducer parts being a graticule having a multiplicity of cycles of a detectable marking along its length and the other of the parts comprising two sensors for sensing the markings of the graticule, the sensors being arranged so that, as they move relative to the graticule, they produce outputs which are phase shifted relative to one another. The outputs are converted to pulses.

The present invention has a number of features, which may be used singly or in any desired combination with one another. These features are as follows.

According to a first feature of the invention, the output pulses provided by the transducer sensors are used to clock the aforesaid primary counter for providing the higher order bits of the digital word representing the position of the armature while the lower order bits are derived directly by the digitized information provided by the sensors.

In a conventional arrangement for example, all bits of the position-indicating digital word are derived from the position counter. This counter must be reset once the linear motor is switched on and to do this the armature is usually automatically moved to a known position relative to the stator to operate a reset switch which resets the counter. However, the exact position at which the reset switch is operated may not be entirely consistent, at least the lower order bit or bits of the output of the position counter is/are sometimes suspect. This in turn, as will hereinafter be explained in more detail, may prevent the motor from being detented at any desired position. Thus utilisation of this invention provides that in place of the lowest or lower order bits of the position counter, one or more bits obtained from the sensors are synthesised by gating circuitry which bypasses the position counter, to enable the motor to be arrested in any desired 'detent' position.

In a second feature of the invention, digital processing circuitry is provided for providing a digital output corresponding to the difference between the detected positions and a desired position defined by a multiple-bit digital word and for energising the armature towards its desired position relative to the stator, commutation information for the motor being provided directly by selected bits of the primary counter which in turn control drive circuitry connected to the motor's coils, further circuitry being provided to modulate the energisation of the motor coils in a continuously variable or quasi-continuously variable fashion depending upon a positional or velocity error. The circuitry may be replaced by software or firmware controlled by suitable processing power.

Preferably, in well known manner, the arrangement is such that while the positional error is greater than a pre-determined value, the control circuitry works in a velocity-servo fashion tending to cause the motor armature to follow a pre-determined velocity profile, and, when the positional error falls into the predetermined range, the circuit switches over to a position-servo mode in which the desired position is reached. The velocity profile is preferably defined in terms of the positional error, and for minimum transit time, is preferably a square root function of the position error.

In a third feature of the invention, the spacing of the graticule markings relative to the spacing of the commutation points of the motor is so chosen that the ratio of the number of graticule marking spacings within a given commutation spacing is a convenient binary multiplicand. By this means, the commutation information provided by the primary counter may, for example, be obtained simply from one or more bits of the higher order bits registered thereby. The motor may be so commutated that a desired thrust/position profile may be obtained. By this means, an externally generated velocity profile may be applied, being matched to the expected performance from the motor at any given position, to effect precise velocity control thereof.

There now follows by way of example a description of the invention with reference to the accompanying drawings in which:

FIG. 3b shows wave-forms arising in operation of the circuitry 3a;

FIG. 3c shows in more detail part of the apparatus of FIG. 3a;

Figure 1:
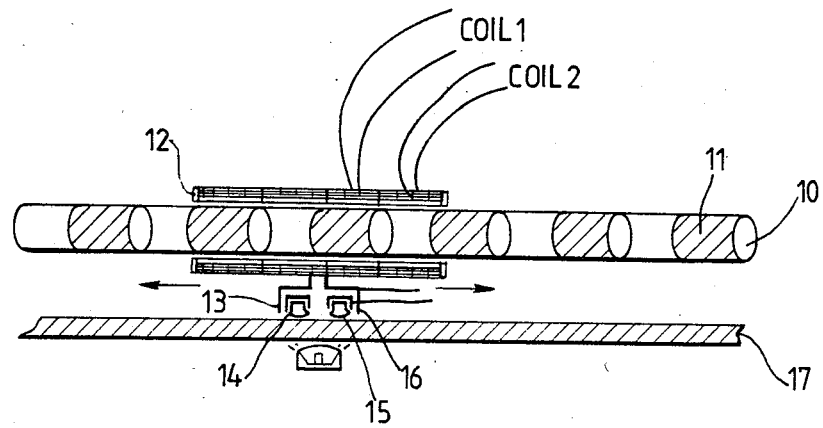
FIG. 1 is a schematic perspective of a linear motor with optical transducer controlled by circuitry according to the present invention.

FIG. 1 shows schematically one form of linear motor connected to control circuitry embodying the present invention. The linear motor, is of the form described more fully in my copending U.K. patent application no. 8114596 the disclosure of which is incorporated herein by way of reference and comprises a tubular stator 10 housing permanent magnets 11 spaced equidistantly along the motor by spacing blocks not shown of the same length as the magnets. The stator is fixed to a suitable chassis. Free to move along the length of the motor is an armature 12. This armature comprises essentially two coils, shown here as coils 1 and 2. Energisation of the coils in a predetermined sequence causes movement of the armature along the stator. A position sensing transducer means 13 is affixed to the armature 12. This comprises two photo-electric devices 14 and 15 mounted within a block 16. Running along the length of the motor is an optical graticule 17. A light emitting source not shown causes light to pass through the graticule on to the cells 14 and 15. The graticule and transducer means provide information to control circuitry as to the position of the armature relative to the stator as well as the absolute position of the armature along the motor.

Figure 2A:
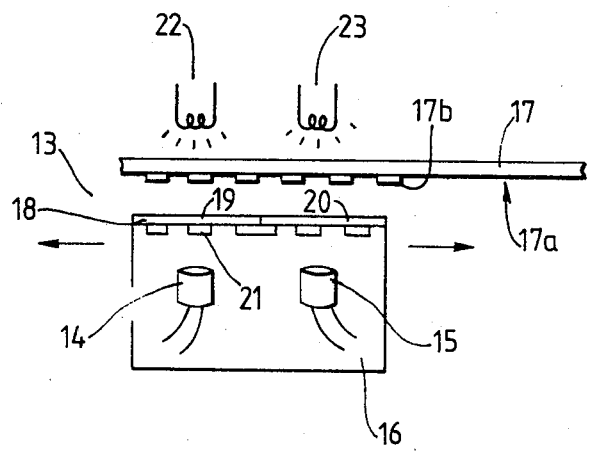
FIG. 2a is a schematic plan view showing to an enlarged scale the optical position transducer system of FIG. 1.

The graticule and transducer means will now be described in more detail with reference to FIG. 2a.

The position transducer, generally designated 13 comprises the graticule 17 which is made up of a transparent material and has ruled on its surface 17a a series of regularly spaced parallel dark markings 17b; these markings 17b are each of equal width and are spaced apart by distances equal to their widths. Disposed to one side of the graticule 17a are the two photo-electric devices 14 and 15 preferably photo-transistors, mounted within the block 16, see FIG. 1, which is fixed to the motor's armature 12. Disposed between them and the graticule 17 is a plate 18 of transparent material which is also fixed to the block 16. This plate 18 comprises two sections 19 and 20 which also have dark markings 21 ruled on them, corresponding to the markings 17b. The markings on the two sections 19 and 20 have a phase shift between them, lengthwise of the graticule 17, of 90°. The photo-transistors 14 and 15 look through the respective sections 19 and 20 and the graticule 17 to light sources 22 and 23 which are disposed to the opposite side of the graticule 17 and are fixed to the mounting block 16 by an arm not shown.

Figure 2B:
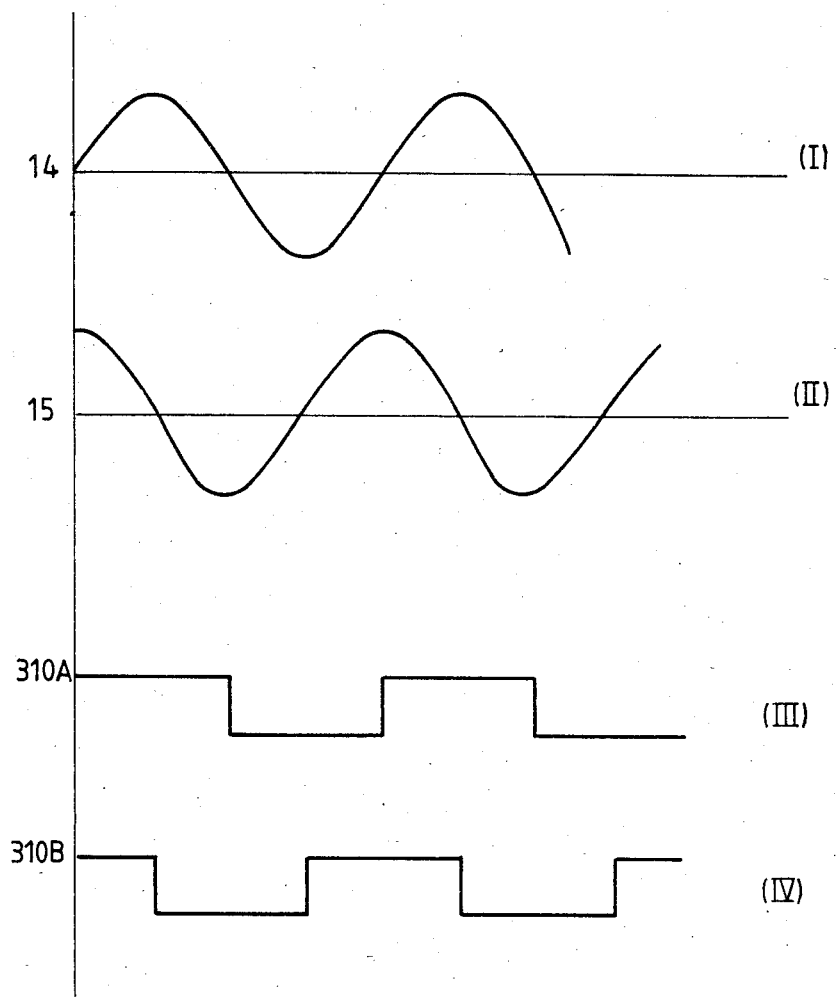
FIG. 2b shows wave-forms produced by the transducer arrangement.

As will be seen from FIG. 2b, (i) and (ii), the outputs from photo-transistors 14 and 15 vary nearly sinusoidally with distance, the two signals being in phase quadrature relative to one another.

As will become apparent from the following description, the use of the two photo-transistors 14 and 15, to produce phase quadrature signals allows the resolution of the position detector 13 to be one quarter of the wavelength of the light and dark stripes on the graticule 17. In one practical embodiment, the wavelength of these stripes was 1/80 of an inch and the resolution of the position detector as a whole, 1/320 of an inch. This, in combination with control circuitry to be explained later, makes possible fine increments in the stopping position of the motor's armature, which can be accurately and repeatably determined. This particularly suits the motor for such applications as an actuator for computer disc memory systems, and as a form of motive power for high precision printers.

Figure 3A:
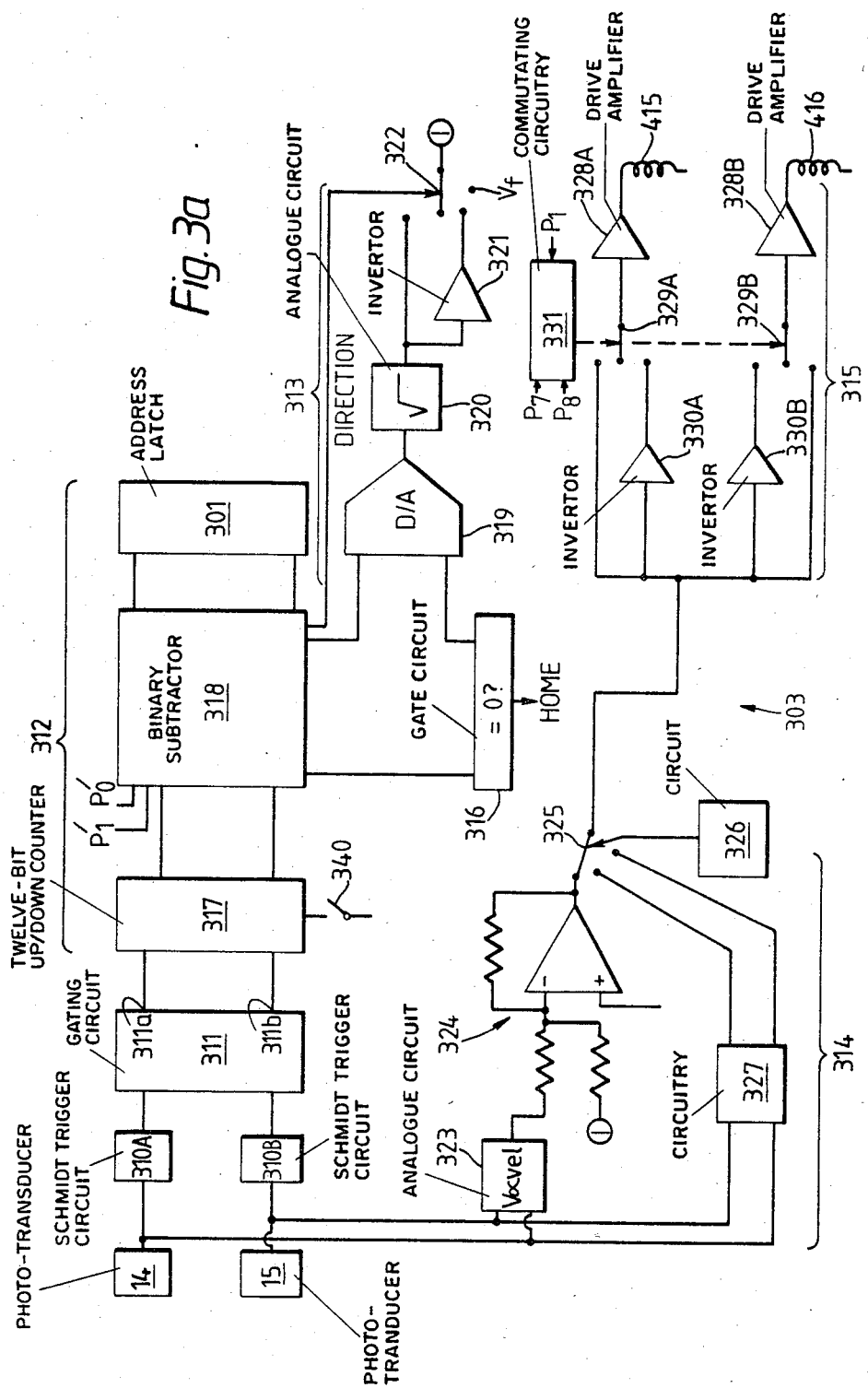
FIG. 3a is a circuit diagram showing in block form the principal components of the circuitry used to control the linear motor.
Figure 3B:
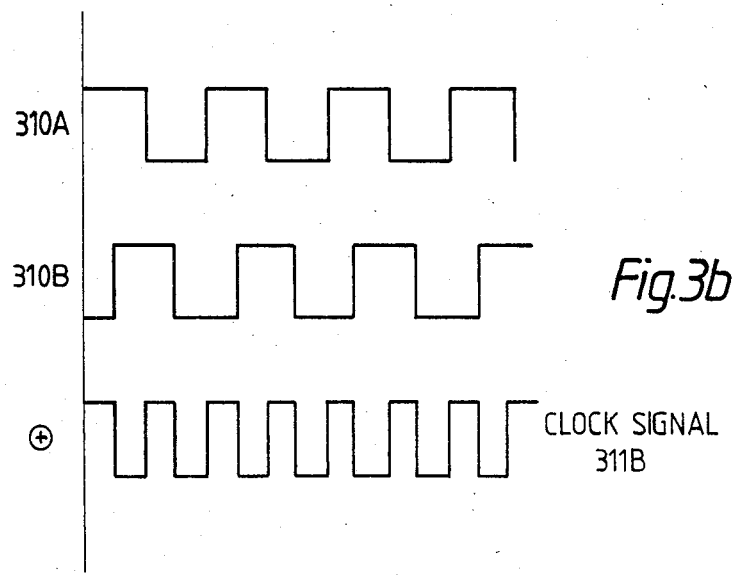

The circuitry used to control the linear motor will now be explained with reference to FIG. 3a, which shows the principal elements in block form.

The outputs from the photo-transducers 14 and 15 are applied to respective Schmidt trigger circuits 310a and 310b to produce waveforms shown in FIG. 2b at iii and iv. The outputs of these two Schmidt triggers are applied to a gating circuit 311 which derives from the squared wave-forms, two output signals, one of which is delivered at output 311a and which is a direction indicating signal, i.e. whether the armature 12 is moving to the left or to the right and the other of which is delivered at ouput 311b being a clock signal which changes state every quarter cycle of the graticule marking, i.e. once every 1/320th of an inch.

Broadly, the major components of the remainder of the circuitry 303 are:

(a) A digital position error circuit 312 which produces a twelve-bit output word indicating the magnitude of the position error, i.e. the distance between the actual and demanded positions and also a direction indicating signal indicating whether the actual position is to the left or to the right of the demanded position.

(b) An analogue velocity profile circuit 313 which produces as an output a velocity profile which the linear motor is required to follow over the major part of its travel to the demanded position, this velocity profile being defined in terms of the positional error.

(c) A servo-mode determining circuit 314, which until the linear motor closely approaches the demanded position, acts as a velocity servo and as the position error decreases, switches over to a position servo action.

(d) Motor coil energization circuitry 315 which controls the magnitude and polarity of the voltages applied to the linear motor coils 415 and 416 (coil 1 and coil 2).

The operation of the circuits 312, 313, 314 and 315 will now be described in somewhat more detail.

The digital position error circuit 312 comprises a twelve-bit up/down counter 317 which is clocked by the circuit 311 so that it changes state up or down, the direction of the change being determined by the state of the output 311a once for every quarter wavelength of the movement relative to the graticule 17. The ten most significant bits of the output of counter 317 and also two lower significance bits generated in a manner described below are applied to one input of a binary subtractor 318, and the other input being from the address latch 301. The twelve-bit output of the subtractor 318 is delivered both to a gate circuit 316 which produces a high output when the eleven most significant bits are zero, and the sign of the subtrahend is, by convention, positive, indicating that the home position has been reached. The output is also delivered to a digital to analogue converter 319 which produces an output voltage proportional to the magnitude of the difference word.

The output of the digital to analogue convertor 319 is connected to an analogue circuit 320 which produces an output voltage which is proportional to the square root of the input voltage. This is to define a square root velocity profile in terms of the detected positional error. This square root law gives an optimum velocity profile. An analogue switch 322 selects the velocity profile signal either direct from the circuit 320 or from an invertor 321 which serves to adjust the polarity of the velocity profile signal according to the direction of the position error, this being controlled by a sign output of the subtractor 318 which indicates this direction.

Within the circuitry 314 an analogue circuit 323 monitors the analogue outputs of the photo-transistors 14 and 15 to produce a voltage proportional to velocity. This is subtracted from the demanded velocity from the velocity profile circuit 313 by means of a summing amplifier 324 to produce a voltage representing the velocity error.

A three way electronic switch 325 is used to determine whether the servo operates in the velocity or position-servo mode, being controlled by a circuit 326 which responds to the state of the home signal and the least significant bits of the demanded address. When out of the "home" position, the switch 325 selects the output of the summing amplifier 324 so that the circuitry operates in a velocity servo-mode. When, on the other hand, the home signal is active, and accurate positioning of the motor is required in a "detent" mode, the circuit 326 changes the switch 325 over to monitor the analogue output of one or other of the photo-transistors 14 and 15. Why and how this is achieved is explained below. Briefly, however, the circuit 326 is arranged so that the switch 325 monitors the selected one of the photo-transistor outputs on the part of its wave-form which has its next zero crossover, as the detent position. Thus with the switch 325 connected to one or other of the photo-transistors 14 and 15 an analogue position servo-mode is achieved. The outputs of the photo-transistors 14 and 15 can be applied to the switch 325 via the circuitry 327 which modifies the position signals to give the desired second order response in the position-servo mode to prevent undesirable oscillations.

Within the circuitry 315, the motor coils 415 and 416 have associated with them respective drive amplifiers 328a and 328b which amplify the signal from the switch 325 via respective electronic switches 329a and 329b. These are each two pole switches and connect direct with the switch 325 or via an invertor 330a and 330b. The state of these two switches is determined by commutating circuitry 331 which responds in both the velocity servo and positional servo modes, in this example, to the seventh and eighth bits from the position counter 317 so that the polarity of the motor coil voltages is appropriately adjusted to maintain the required direction of the thrust for movement of the armature 12. This is explained in further detail below. For this purpose it is convenient to arrange the stator pole pitch of the linear motor to correspond with an integral power of two time one quarter of the graticule wavelength. It is then a simple matter to commutate the coil voltages directly using bits seven and eight of the position counter 317.

It will be appreciated that at any given detent position, the selected slope of one of the analogue outputs of the photo-transistors 14 and 15 may be positive or negative depending on the demanded address. For example, a binary address having least significant bits 00 and 01 might select positive going portions of the outputs whereas a binary address of 10 or 11 would select negative going portions, (see FIG. 3d).

In the position servo mode therefore, as well as responding to bits seven and eight of the position counter, the circuitry 331 also responds to the second least significant bit of the absolute address so as to invert the polarity of the coil currents in order to correct the sign of the gradient of the selected photo-transistor output which would otherwise cause the motor to move out of its desired detent position.

Before the start of printing, after power-up of the printer, the position counter is re-set. One of the coils of the motor 415 or 416 is then energised by separate circuitry. After a predetermined delay, the other coil is then energised also. Or the reverse of this sequence may take place. This arrangement ensures that the armature will move to an unambiguous stable position relative to the stator corresponding to a commutation position. Because the position counter is reset, bits 7 and 8 both have zero values, i.e. the conditions of bits 7 and 8 are in synchronism with the desired commutation position achieved by the reset routine. A velocity reference signal Vf is produced to cause movement of the motor to the left. At the same time, the position counter is allowed to cycle, so keeping bits 7 and 8 in synchronism with the movement of the motor, which they then control. As a result the motor continues its motion to the left at a steady speed, until an optical or mechanical reset switch 340 is activated, which resets the actual-position counter 317 again to zero. However, the exact position at which the limit switch 340 is operated may vary slightly from operation to operation.

The reason for this is as follows. Typically limit switches may be in the form of a paddle mounted on the armature interupting a fixed optical beam sensing device. The exact point at which the sensing device registers the limit of movement varies slightly according to external factors such as ambient light. Therefore the limit position switch may reset the position counter with an accuracy considerably less than the resolution obtainable from the graticule and photo-transistors. For example, assuming in this case 1/80" variance the reset might occur at a physical position at which the digitized output of the two photo-transistors could be at any value between 00 and 11 depending on the ambient conditions. Therefore, the least significant bits available from the position counter cannot be depended upon to be in synchronism with the digitalized outputs from the two photo-transistors. It follows from this, by way of example, that they cannot therefore be utilised for such a function as mentioned earlier to correct the sign of the gradient of the analogue outputs when in the "home" position according to the demanded detent address. For reliable operation, the digitised outputs themselves must be utilised for this type of function, and it is for this reason that the least significant bits of the digital word representing the position of the armature are derived directly from the position transducer.

Figure 3C:
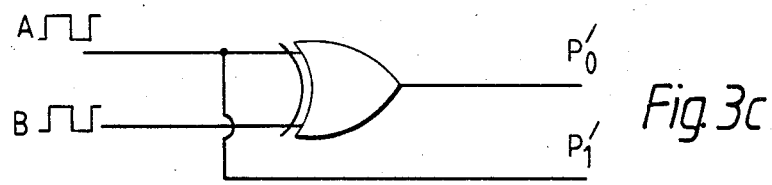

To effect a solution, substitute bits derived directly from the position transducer are used instead as the lower order bits of the position word; the number of substituted bits should be great enough so that the corresponding distance along the length of the motor is greater than the positional uncertainty associated with the reset switch. In the illustrated embodiment, two substitute bits are therefore used instead, P' (0) and P' (1). These are produced as shown in FIG. 3c. The output of the Schmidt trigger 310a associated with the photo-transistor 14 is used as P' (1) and P' (0) is produced by combining the outputs of triggers 311a and b in an exclusive-or fashion as shown in FIG. 3c.

The up/down and clock signal generating circuit 311 uses flip flops and an arrangement of gates to monitor the state of the outputs of photo-transistors 14 and 15 at each transition of each one of them and to compare the states after a transition with those before to determine the direction of the movement of the armature and also to generate the clock pulses. A clock pulse to the position counter 317 is only produced if the states of P' (0) and P'(1) were both low prior to the transition and high after it or vice versa.

Figure 3D:
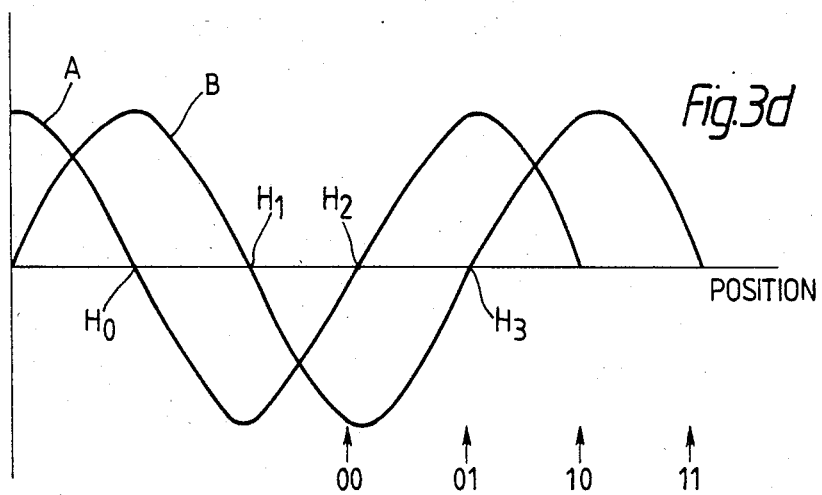
FIG. 3d shows the outputs of the position sensors being used to make the final positional adjustment.

FIG. 3d shows the intended function of the switch control circuit 326 when it is operating in the position servo mode and selecting between one of the waveforms A and B from the two photo-transistors.

Figure 4:
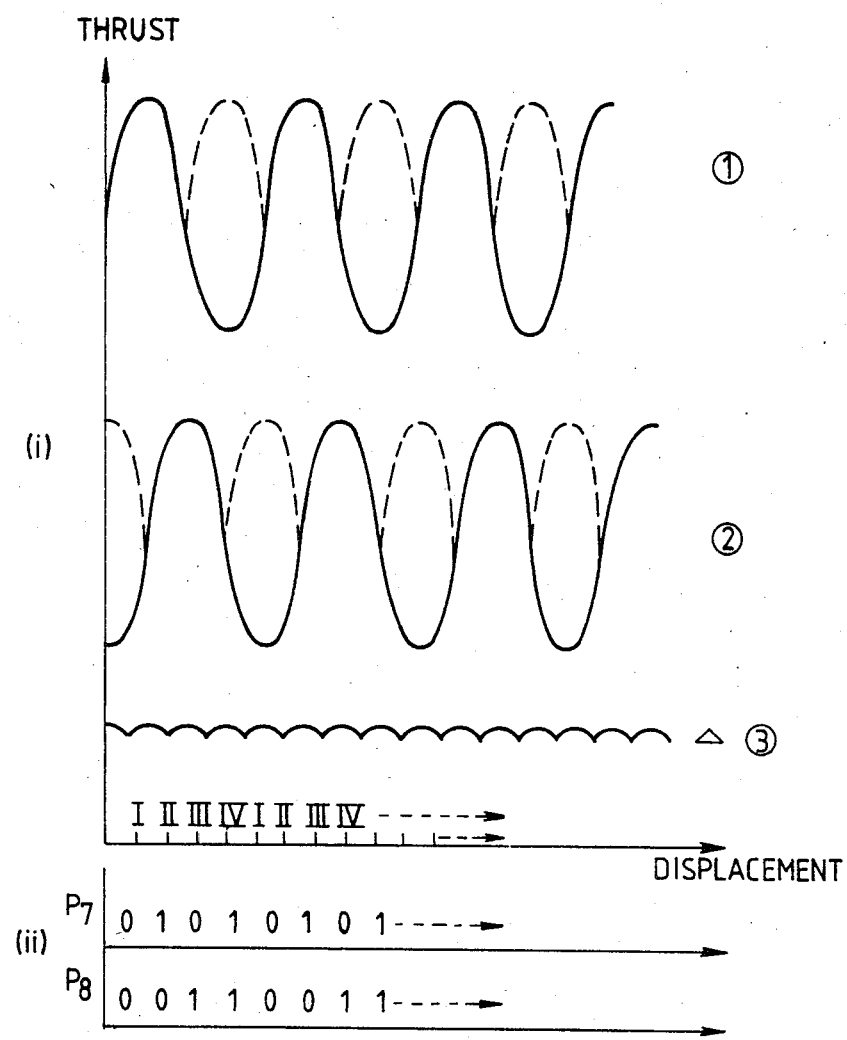
FIG. 4 illustrates thrust wave-forms produced by the linear motor.

Suppose the demanded address is such that when moving to the right, the home signal goes active at the B wave-form crossover H1. Suppose further that for convenience the wave-form is then selected by the circuit 326. The linear motor will then servo to the next A crossover, i.e. H2 which is one position offset from H1. It will be appreciated that the home position spans two transitions' worth, from H1 to H3 in order to allow the motor to settle at the centre point of H2 of the A waveform. If the home signal goes active at the A crossover position H2, the B waveform is then selected by circuit 326 and in a similar fashion the motor will then servo to the next B crossover, i.e. H3. Similarly the same actions will occur for home positions H0 and H3. An important consideration in any closed loop system controlling a motor is that the thrust available from the motor should be predictable for efficient servoaction. With the exception of alternating current type linear motors, conventional stepping motors produce non-uniform thrust/displacement profiles. The form of motor described in my copending application no. 8114596 however is capable of producing nearly linear thrust, when controlled by the circuitry described herein. This is explained with reference to FIG. 4 showing in solid outline thrust versus displacement profiles at (1) and (2) which would be produced were the coils of a two coil version of the motor to be permanently energised. The dotted outlines show half phase reversal of the thrust from each coil. On account of the fact that the thrust profiles are effectively in phase quadrature, it can be seen that by switching from one thrust profile to the other and effecting the half phase reversal, a nearly uniform thrust profile is obtained, see waveform (3). In practice the variance experienced in this simple system is less than 18%. This commutation, as has already been explained, is effected by use of bits P7 and P8 which provide the necessary logic combination. Combinations of other bits and joint energisation of both coils can provide an almost straight line thrust profile. In the event of the motor being detented at an address coinciding with a commutation bit change a further advantage of using bits direct from the counter arises in that the commutation is automatically synchronised with the zero crossover point of one of the photo-transistor outputs, i.e. at an H position as shown in FIG. 3d. Thus undesirable 'back emf' spikes are avoided, discontinuity in thrust displacement relation is avoided and detenting occurs in the same manner at any position in between commutation points.

Thus the foregoing description in total discloses means for providing precise positional and velocity control of a linear motor making such a motor suitable for a range of applications. It will be appreciated that numerous variations are possible for example the use of microprocessor soft- and firmware to carry out the functions shown in FIG. 3a.

I claim:

1. A servo device comprising a position transducer having two relatively movable parts and at least one output, and circuitry comprising a digital counter, the digital counter having a plurality of outputs, the circuitry being adapted to provide a digital word representing the relative position of the two transducer parts, higher order bits of the digital word being derived from the outputs of said digital counter cycled by the output of the transducer and the lower order bit or bits being derived directly from the output of the position transducer.

2. A device according to claim 1 wherein the transducer has two digital outputs with a phase shift between them and there are two such lower order bits, one of the digital outputs of the transducer being used as the lowest order bit and further comprising an exclusive-OR circuit, the other lower order bit being derived by the exclusive-OR circuit arranged to combine the two digital outputs of the transducer.

3. A device according to claim 1 and including means for comparing the digital word with a further digital word representing a demanded relative position and for producing a position error signal to control the operation of a motor.

4. A device according to claim 3 wherein the error signal is analogue.

5. A device according to claim 3 wherein the circuitry is operative to derive a velocity signal from an output of the transducer, to derive a velocity error signal representing the error between the actual velocity and a demanded velocity as determined by a predetermined velocity/position profile and to substitute the velocity error signal for the position error signal as the drive signal while the position error is greater than a predetermined value.

6. A device according to any one of claims 3 to 5 and including means for producing a "home" signal when higher order bits of the digital word are the same as the corresponding bits of the further digital word, the circuitry being adapted so that when the "home" signal is active, an analogue signal from an output of the position transducer is used as the position error signal for servo operation.

7. In combination: a linear motor comprising a stator and an armature movable lengthwise relative to one another, the stator and armature each comprising a respective set of magnets disposed in a predetermined sequence in the direction of relative movements, the magnets of one set being arranged in a stack lengthwise of the direction of relative movement and the poles of the other set of magnets being annular and disposed around and slidable relative to the stack, one set of magnets being permanent magnets and the other set being provided by coil windings, the arrangement being such that by appropriate energisation of the coil windings a net thrust to cause relative movement of the armature and stator in a desired direction can be produced at any position in a range of relative armature and stator positions; and a servo device comprising a position transducer having two relatively movable parts, one being fixed relative to the armature and the other being fixed relative to the stator and at least one output; and circuitry, comprising a digital counter, the digital counter having a plurality of outputs, the circuitry being adapted to provide a digital word representing the relative position of the two transducer parts, higher order bits of the digital word being derived from the outputs of said digital counter cycled by the output of the transducer and the lower order bit or bits being derived directly from the output of the position transducer, the circuitry including means to produce drive signals for the motor coils from said digital word.

8. A combination according to claim 7 wherein the transducer has two digital outputs with a phase shift between them and there are two such lower order bits, one of the digital outputs of the transducer being used as the lowest order bit and further comprising an exclusive-OR circuit, the other lower order bit being derived by the exclusive-OR circuit arranged to combine the two digital outputs of the transducer in exclusive-or fashion.

9. A combination according to claim 7 and including means for comparing the digital word with a further digital word representing a demanded relative position and for producing a position error signal to control the operation of said motor.

10. A combination according to claim 9 wherein the position error signal is analogue.

11. A combination according to claim 9 or 10 wherein the circuitry is operative to derive a velocity signal from an output of the transducer, to derive a velocity error signal representing the error between the actual velocity and a demanded velocity as determined by a predetermined velocity/position profile and to substitute the velocity error signal for the position error signal as the drive signal while the position error is greater than a predetermined value.

12. A combination according to claim 9 and including means for producing a "home" signal when higher order bits of the digital word are the same as the corresponding bits of the further digital word, the circuitry being adapted so that when the "home" signal is active, an analogue signal from an output of the position transducer is used as the position error signal for servo operation.

13. A combination according to claim 7 wherein some of the higher order bits of the digital word are used to control commutation of the motor coils.

14. A combination according to claim 13 wherein commutation is effected by controlling the polarity of the drive signals applied to the coils.

15. A combination according to claim 12 wherein when using a position error signal as the motor coil drive signals, its polarity is also controlled in accordance with the slope of the output of the transducer to ensure negative feedback operation.

16. A combination according to claim 7 wherein one of the parts of the transducer has a multiplicity of cycles of a detectable marking lengthwise of the direction of relative movement of the armature and stator, the motor coils having a commutation spacing lengthwise of the motor which equals the repeat length of the detectable marking times 2 raised to the power "n", n being a positive integer or 0.

17. A combination according to claim 7 wherein the control circuitry is adapted to modulate the motor thrust by adjusting the commutation of the motor.

18. A combination according to claim 14 wherein when using a position error signal as the motor coil drive signals, its polarity is also controlled in accordance with the slope of the output of the transducer to ensure negative feedback operation.

19. A combination according to claim 17 wherein the modulation is effective to linearise the thrust/position profile of the motor.

20. A combination according to claim 17 wherein the modulation is used to achieve a desired velocity profile.

* * * * *